(12) United States Patent
Hori et al.

(10) Patent No.: US 6,545,112 B2
(45) Date of Patent: *Apr. 8, 2003

(54) PROCESS FOR PRODUCING β-BUTYROLACTONE HOMOPOLYMER OR COPOLYMER

(75) Inventors: Yoji Hori, Kanagawa (JP); Yoshiharu Gonda, Kanagawa (JP); Toshimitsu Hagiwara, Kanagawa (JP)

(73) Assignee: Takasago International Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,204

(22) Filed: Jan. 19, 1999

(65) Prior Publication Data

US 2002/0052458 A1 May 2, 2002

(30) Foreign Application Priority Data

Jan. 19, 1998 (JP) .............................. 10-021435

(51) Int. Cl.⁷ .............................................. C08F 124/00
(52) U.S. Cl. ...................... 526/270; 526/170; 526/172; 526/209; 526/266
(58) Field of Search ................. 526/170, 172, 526/209, 266, 270

(56) References Cited

U.S. PATENT DOCUMENTS 5,461,139 A * 10/1995 Gonda et al. .............. 528/361
5,516,883 A * 5/1996 Hori et al. ................. 528/354
5,631,344 A * 5/1997 Hongo et al. .............. 528/283

FOREIGN PATENT DOCUMENTS

EP 0 686 656 * 12/1995
EP 0 723 983 * 7/1996

* cited by examiner

Primary Examiner—Helen L. Pezzuto
(74) Attorney, Agent, or Firm—Sughrue Mion, PLLC

(57) ABSTRACT

The object of the invention is to provides a process in which a high-molecular-weight β-butyrolactone homopolymer or copolymer being biodegradable, absorbable into the living body, useful as a functional polymeric material and superior in physical characteristics is produced with high yield and good productivity. This object is solved by a process for producing the homopolymer or copolymer of the invention, which comprises ring-opening polymerization of sole β-butyrolactone subjected previously to acid removal and dehydration treatment, or of said β-butyrolactone with other lactones, in the presence of a tin compound represented by the following formula (1) and/or formula (2):

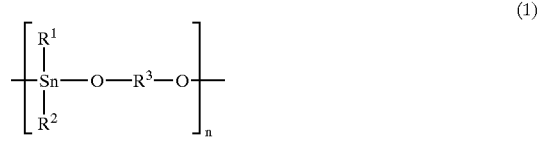

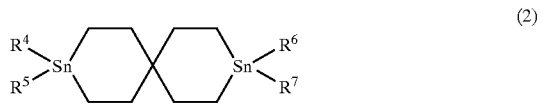

wherein $R^1$ and $R^2$ and $R^4$ to $R^7$ independently represent an alkyl group containing 1 to 12 carbon atoms which may have a branched chain, or a cycloalkyl group containing 5 to 7 carbon atoms, or a phenyl or naphthyl group which may have a substituent group, $R^3$ represents an alkylene group containing 2 to 12 carbon atoms which may have a substituent group, a cyclopentane-1,2-ylene group or a cyclohexane-1,2-ylene group, and n is an integer of 1 to 10.

23 Claims, 1 Drawing Sheet

Thickness 1.61mm

PROCESS FOR PRODUCING β-BUTYROLACTONE HOMOPOLYMER OR COPOLYMER

FIELD OF THE INVENTION

The present invention relates to a process for producing a β-butyrolactone homopolymer or copolymer having the characteristics of biodegradability and biological absorption and being useful as a functional polymeric material, as well as polymers obtained therefrom. In particular, the present invention relates to a process for producing a β-butyrolactone homopolymer or copolymer having an extremely high molecular weight never achieved which comprises ring-opening polymerization of specifically pretreated β-butyrolactone alone or ring-opening copolymerization thereof with other lactones in the presence of a specific catalyst, as well as polymers obtained thereby.

BACKGROUND OF THE INVENTION

In recent years, it is reported that there are a large number of microorganisms producing and accumulating therein a polymer consisting of 3-hydroxybutyric acid units, derived from β-butyrolactone, particularly (R)-3-hydroxybutyric acid units[see P. A. Holmes, Phys. Technol., Vol. 16, p. 32 (1985); "Biodegradable Polymeric Material", p. 26, written by Yoshiharu Doi and published by Kogyo Chosakai Publishing Co., Ltd. (1990)]. It is reported that the microbially produced polymer consisting of (R)-3-hydroxybutyric acid units and having a number average molecular weight as high as 100,000 to 1,000,000 is a thermoplastic resin [Microbial Polyesters, p. 2, written by Yoshiharu Doi, VCH Publishers (1990)].

The polymer consisting of 3-hydroxybutyric acid units is biodegradable, enzymatically hydrolyzable and biocompatible, and thus attracts attention as a functional material, and its production process using microorganisms or enzyme reaction has been attempted [see "Biodegradable Polymeric Material" written by Yoshiharu Doi and published by Kogyo Chosakai Publishing Co., Ltd. (1990); JP-A-4-292619]. (The term "JP-A" as used herein means an "unexamined published Japanese patent application".) However, the production process using microorganisms or enzyme reaction requires cumbersome procedures in e.g. preparing special microorganisms and separating the formed polymer from the microorganisms, and further the amount of the polymer produced is low, resulting in low productivity and high costs.

Besides the process using microorganisms, a wide variety of processes for producing poly(3-hydroxybutyric acid) by chemical ring-opening polymerization of racemic β-butyrolactone have been proposed, and such prior art includes: (1) a method using a catalyst system consisting of triethyl alminium and water [R. A. Gross et al., Macromolecules, Vol. 21, pp. 2657–2668 (1988)], (2) a method using a catalyst system consisting of diethyl zinc and water [Y. Zhang et al., Macromolecules, Vol. 23, pp. 3206–3212 (1990); N. Tanahashi et al., Macromolecules, Vol. 24, pp. 5732–5733 (1991)], (3) a method using an aluminum-porphyrin complex as a catalyst [S. Asano et al., Macromolecules, Vol. 18, pp. 2057–2061 (1985)], (4) a method using a potassium compound or a solution thereof as a polymerization initiator [Z. Jedlinski et al., Macromolecules, Vol. 18, pp. 2679–2683 (1985)], (5) a method using a metal alkoxide with magnesium, tin or the like as a polymerization initiator [H. R. Kricheldorf et al., Macromolecules, Vol. 21, pp. 286–293 (1988)], and (6) a method using a 6-membered cyclic tin compound or a spiro cyclic tin compound as a polymerization initiator [H. R. Kricheldorf et al., Macromolecules, Vol. 28, pp. 6718–6725 (1995); H. R. Kricheldorf et al., Macromolecules, Vol. 29, pp. 8689–8695 (1996)].

However, the racemic β-butyrolactone polymer i.e. racemic poly(3-hydroxybutyric acid) obtained in the conventional methods (1) to (6) described above is a low-molecular polymer with a weight average molecular weight of 39,000 or less, so it cannot be used to produce films or other products smoothly, and even if films etc. are obtained, these products are inferior in physical characteristics and poor in practical usability.

Under these circumstances, the present inventors have made studies to permit a β-butyrolactone polymer having practically durable physical characteristics with a high molecular weight and being effectively usable for various molded articles and other purposes to be produced with good productivity by a chemical method without using any microorganism. As a result, the present inventors found that a β-butyrolactone homopolymer [poly(3-hydroxybutyric acid)] having a considerably higher molecular weight (weight average molecular weight of about 100,000 to 860,000) and a copolymer of β-butyrolactone with other lactones having a considerably higher molecular weight (weight average molecular weight of about 100,000 to 400,000) than those achieved in the conventional synthesis methods described above can be obtained by ring-opening polymerization of β-butyrolactone alone, or of β-butyrolactone with other lactones, in the presence of a specific catalyst, that is, one or more tin compounds selected from specific distannoxane derivatives having halogen atoms and/or isocyanate groups, carboxylic acid tin compounds and di-lower alkyl tin oxides, and the present inventors have previously filed patent applications therefor (JP-A-6-256482, JP-A-6-329768, and JP-A-8-53540).

On the basis of these applications, the present inventors have made further extensive examination. As a result, the inventors found that a β-butyrolactone homopolymer or copolymer having a considerably higher molecular weight than those achieved in the present inventors' methods described in JP-A-6-256482, JP-A-6-329768, and JP-A-8-53540 can be obtained with high yield and good productivity by polymerization of β-butyrolactone alone or copolymerization thereof with other lactones by using as a catalyst at least member selected from tin compounds represented by the general formulae (1) and (2) below, following removal of acids and water contained in the β-butyrolactone, and the present invention was thereby completed. Both the presently obtained β-butyrolactone homopolymer and copolymer have a high weight average molecular weight of 500,000 or more, sometimes 1,000,000 or more, and in particular, the β-butyrolactone homopolymer having a weight average molecular weight exceeding 860,000 can be easily obtained.

SUMMARY OF THE INVENTION

Accordingly, the present invention relates to a process for producing a β-butyrolactone homopolymer or copolymer which comprises ring-opening polymerization of β-butyrolactone alone, or β-butyrolactone with other lactones, in which the ring-opening polymerization is conducted using β-butyrolactone subjected previously to acid removal and dehydration treatment and in the presence of one or more compounds selected from the group consisting of tin compounds (referred to hereinafter as tin compound (1)) represented by the general formula (1):

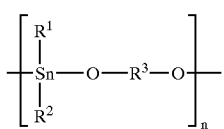

(1)

wherein $R^1$ and $R^2$ independently represent an alkyl group containing 1 to 12 carbon atoms which may have a branched chain, or a cycloalkyl group containing 5 to 7 carbon atoms, or a phenyl or naphthyl group which may have a substituent group, $R^3$ represents an alkylene group containing 2 to 12 carbon atoms which may have a substituent group, a cyclopentane-1,2-ylene group or a cyclohexane-1,2-ylene group, and n is an integer of 1 to 10,
and tin compounds (referred to hereinafter as tin compound (2)) represented by the general formula (2):

(2)

wherein $R^4$ to $R^7$ independently represent an alkyl group containing 1 to 12 carbon atoms which may have a branched chain, or a cycloalkyl group containing 5 to 7 carbon atoms, or a phenyl or naphthyl group which may have a substituent group.

DETAILED DESCRIPTION OF THE INVENTION

Figure 1:
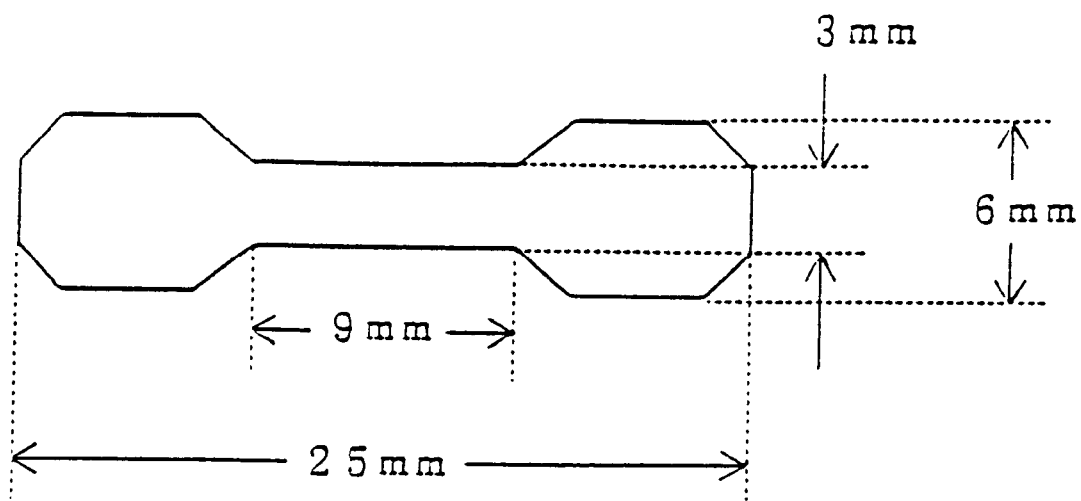
FIG. 1 is a drawing showing the shape and dimension of a dumbbell (specimen) used for measurement of tensile strength and elongation in the Examples and Comparative Examples.

Hereinafter, the present invention is described in detail.

β-Butyrolactone used in the present invention may be a racemate, (R)-isomer, (S)-isomer, or a mixture thereof, depending on e.g. use of the resulting polymer. Production of β-butyrolactone is not particularly limited, and it may be produced by any methods known in the art. A non-limiting example of β-butyrolactone used in the present invention is that easily obtainable by a process described in JP-A-6-128245, JP-A-7-188201 or JP-A-7-206885, that is, a process for producing (R)- or (S)-β-butyrolactone by asymmetrical hydrogenation of diketene in the presence of a ruthenium/optically active phosphine complex as a catalyst. The racemic β-butyrolactone may be a commercial product. β-Butyrolactone may be used whether its optical purity is high or low.

β-Butyrolactone used in the present invention should be β-butyrolactone subjected previously to acid removal and dehydration treatment. If β-butyrolactone subjected to neither acid removal nor dehydration treatment or β-butyrolactone subjected to only dehydration treatment is used, a high-molecular polymer cannot be obtained even using the same tin compounds (1) and/or (2) as in the present invention, and the number average molecular weight of the resulting β-butyrolactone homopolymer and copolymer is usually 60,000 or less.

The order of acid removal and dehydration treatment for β-butyrolactone in the present invention is not particularly limited, and the β-butyrolactone may be subjected first to acid removal and then to dehydration treatment, or first to dehydration treatment and then to acid removal, or subjected simultaneously to acid removal and dehydration treatment, but β-butyrolactone subjected first to acid removal and then to dehydration treatment is preferably used because it is made absolutely water-free.

In a generally preferred method for removing acids contained in β-butyrolactone, one or more alkaline compounds as such or after suspended in a small amount of non-aqueous medium in some cases are added to β-butyrolactone and reacted with acids (mainly butyric acid) contained in β-butyrolactone to form salts which are then removed from the butyrolactone. The alkaline compounds used for acid removal may be inorganic alkaline compounds, organic alkaline compounds, or a mixture thereof.

Among those described above, preferably used in the present invention are one or more inorganic alkaline compounds such as alkali metal or alkaline earth metal carbonates, hydrogen carbonates, oxides etc., and specific examples are sodium carbonate, potassium carbonate, calcium carbonate, magnesium carbonate, barium carbonate, sodium hydrogen carbonate, potassium hydrogen carbonate, calcium oxide, magnesium oxide and barium oxide. Among those enumerated above, sodium carbonate, potassium carbonate etc. are preferably used because these are available readily and inexpensively. If the inorganic alkaline compounds described above are used, salts insoluble in β-butyrolactone are formed in the form of solid from acids contained in β-butyrolactone and the inorganic alkaline compounds, so these salts are removed by e.g. filtration from β-butyrolactone in the form of liquid whereby the acids in β-butyrolactone can be easily removed.

The amount of the alkaline compound added to β-butyrolactone may be regulated depending on the amount of acids in β-butyrolactone, and generally the alkaline compound is added preferably in an amount of about 1- to 2-fold excess moles relative to the acids contained in β-butyrolactone.

For acid removal, any method can be used insofar as acids can be removed from β-butyrolactone without denaturing or reducing β-butyrolactone, and generally the alkaline compound as such or after suspended in a non-aqueous medium in some cases as described above is added to β-butyrolactone, and the acids and the alkaline compound are reacted at a temperature of 0 to 30° C., preferably under stirring for 2 to 24 hours to form salts which are then removed from the butyrolactone by filtration or any other method.

Acid removal is conducted preferably in an inert gas atmosphere (e.g. argon gas, nitrogen gas etc.).

The β-butyrolactone made acid-free as described above is then subjected to dehydration treatment to remove the water contained in the β-butyrolactone. For dehydration treatment of the β-butyrolactone, any method can be used insofar as the water contained in the β-butyrolactone can smoothly be removed therefrom. In particular, a method of removing water by adding a drying agent to β-butyrolactone is preferably used, and examples of such drying agents are calcium hydride, magnesium oxide, barium oxide etc. and one or more thereof can be used. The amount of the drying agent added to β-butyrolactone may be regulated depending on the water content of β-butyrolactone. The dehydration treatment is carried out preferably in an inert gas atmosphere (e.g. argon gas, nitrogen gas etc.).

While the drying agent remains in the thus dehydrated β-butyrolactone or after the drying agent is removed therefrom, the solution of the β-butyrolactone is distilled to give the β-butyrolactone used in the present invention. The distillation operation is performed preferably under reduced pressure, specifically under a reduced pressure of 10 to 100 Torr at a temperature in the range of 50 to 100° C., more preferably under a reduced pressure of 10 to 25 Torr at a temperature in the range of 50 to 70° C. The β-butyrolactone thus obtained is stored preferably in an inert gas atmosphere (e.g. argon gas, nitrogen gas etc.) until production of the polymer.

In the present invention, the β-butyrolactone made acid-free and dehydrated as described above is used alone or in combination with other lactones to produce a β-butyrolactone homopolymer or copolymer, that is, a lactone-derived polyester having 3-hydroxybutyric acid units.

To produce the β-butyrolactone copolymer, any lactones with 4- to 17-membered rings except for β-butyrolactone can be used as other lactones, and examples are those with a 4-membered ring, such as β-propiolactone, α-methyl-β-propiolactone, α,α-dimethyl-β-propiolactone, α,β-dimethyl-β-propiolactone, β-ethyl-β-propiolactone, β-propyl-β-propiolactone, β-butyl-β-propiolactone, β-pentyl-β-propiolactone, and β-pentadecyl-β-propiolactone; those with a 5-membered ring, such as γ-butyrolactone, α-methyl-γ-butyrolactone, β-methyl-γ-butyrolactone and γ-methyl-γ-butyrolactone; those with a 6-membered ring, such as δ-valerolactone and β-methyl-δ-valerolactone; those with a 7-membered ring, such as ε-caprolactone and 7-methyl-1,4-dioxepane-5-one; those with a 12-membered ring, such as 11-undecanolide etc.; those with a 16-membered ring, such as 15-pentadecanolide etc.; and those with a 17-membered ring, such as 16-hexadecanolide, 9-hexadecene-16-olide, 12-oxa-16-hexadecanolide, 11-oxa-16-hexadecanolide and 10-oxa-16-hexadecanolide. One or more of the other lactones enumerated above can be used in the present invention.

Although the other lactones may be commercial products or synthesized for the present invention, these are preferably purified products in any cases. For example, the other lactones are preferably those stored in an inert gas until use after purified by repeating distillation once or twice or more in the presence of a drying agent such as calcium hydride, magnesium oxide or barium oxide. The other lactones are more preferably those which before the dehydration and distillation treatment described above, are made acid-free in the same manner as for β-butyrolactone.

In producing a copolymer of β-butyrolactone with other lactones, the ratio of β-butyrolactone to other lactones in the copolymer is not particularly limited and can be regulated depending on use of the resulting copolymer, and generally the molar ratio of β-butyrolactone:other lactones ranges from 99:1 to 1:99, preferably from 99:1 to 50:50.

As necessary, other monomer units may be allowed to be present along with β-butyrolactone and other lactones.

In the present invention, homopolymerization of β-butyrolactone or copolymerization of β-butyrolactone with other lactones is conducted in the presence of one or more member selected from the group consisting of the tin compounds (1) and (2) described above.

The process for producing the tin compounds (1) and/or (2) used in the present invention is not particularly limited, and any process can be used. Although the process is not limited, the tin compounds (1) and/or (2) used in the present invention can be easily obtained in a usual manner for example by azeotropic dehydration of di-substituted tin oxides and diols in an inert solvent [see J. Organomet. Chem. 5, p. 262 (1966); Macromolecules, Vol. 28, pp. 6718–6725 (1995); Macromolecules, Vol. 29, pp. 8689–8695 (1996)].

In the tin compound (1), $R^1$ and $R^2$ independently represent an alkyl group containing 1 to 12 carbon atoms which may have a branched chain, or a cycloalkyl group containing 5 to 7 carbon atoms, or a phenyl or naphthyl group which may have a substituent group.

$R^3$ represents an alkylene group containing 2 to 12 carbon atoms which may have a substituent group, a cyclopentane-1,2-ylene group or a cyclohexane-1,2-ylene group. If $R^3$ is an alkylene group containing 2 to 12 carbon atoms having a substituent group, this substituent group is preferably a lower alkyl group containing 1 or 2 carbon atoms which may have a hydroxyl group; methoxymethyl group; cyclohexyl group; or phenyl or naphthyl group which may have a hydroxyl group.

And n is an integer of 1 to 10

$R^1$ and $R^2$ in the tin compound (1) are alkyl groups each containing 1 to 12 carbon atoms which may have a branched chain, and examples are methyl group, ethyl group, n-propyl group, i-propyl group, n-butyl group, t-butyl group, linear or branched pentyl group, hexyl group, heptyl group, octyl group, decyl group etc.; cyclohexyl group; phenyl group; substituted phenyl group such as p-bromophenyl group, p-methoxyphenyl group etc.; and naphthyl group. Among these, $R^1$ and $R^2$ are preferably n-butyl groups.

Examples of $R^3$ in the tin compounds include alkylene groups such as ethylene group, methylethylene group, 1,2-dimethylethylene group, 1,1,2,2-tetramethylethylene group, trimethylene group, 2,2-dimethyltrimethylene group, tetramethylene group, pentamethylene group, hexamethylene group etc.; cyclopentane-1,2-ylene groups such as trans-cyclopentane-1,2-ylene group, cis-cyclopentane-1,2-ylene etc.; and cyclohexane-1,2-ylene groups such as trans-cyclohexane-1,2-ylene group, cis-cyclohexane-1,2-ylene group etc.

When $R^1$ or $R^2$ is a phenyl or naphthyl group which may have a substituent group, the substituent group can also be a lower alkyl group of 1 to 4 carbon atoms or a lower alkoxy group of 1 to 4 carbon atoms.

In addition to the substituent groups earlier given for the situation where $R^3$ is an alkylene group containing 2 to 12 carbon atoms, the substituent groups can also be a lower alkyl group of 1 to 4 carbon atoms, a lower alkoxy group of 1 to 4 carbon atoms or a hydroxyl group.

Preferable examples of tin compound (1) include 1,1-dimethylstanna-2,5-dioxacyclopentane, 1,1-diethylstanna-2,5-dioxacyclopentane, 1,1-dibutylstanna-2,5-dioxacyclopentane, 1,1-dioctylstanna-2,5-dioxacyclopentane, 1,1-didodecylstanna-2,5-dioxacyclopentane, 1,1-diphenylstanna-2,5-dioxacyclopentane, 1,1-dibutylstanna-3-methyl-2,5-dioxacyclopentane, 1,1-dioctylstanna-3-methyl-2,5-dioxacyclopentane, 1,1-dibutylstanna-3,4-dimethyl-2,5-dioxacyclopentane, 1,1-dioctylstanna-3,4-dimethyl-2,5-dioxacyclopentane, 1,1-dibutylstanna-3,3,4,4-tetramethyl-2,5-dioxacyclopentane, 1,1-dioctylstanna-3,3,4,4-tetramethyl-2,5-dioxacyclopentane, trans-dibutyltin-1,2-dioxacyclopentane, trans-dioctyltin-1,2-dioxycyclopentane, cis-dibutyltin-1,2-dioxycyclopentane, cis-dioctyltin-1,2-dioxycyclopentane, trans-dibutyltin-1,2-dioxycyclohexane, trans-dioctyltin-1,2-dioxycyclohexane, cis-dibutyltin-1,2-dioxycyclohexane, cis-dioctyltin-1,2-dioxycyclohexane, 1,1-dimethylstanna-2,6-dioxacyclohexane, 1,1- dibutylstanna-2,6-dioxacyclohexane, 1,1-dioctylstanna-2,6-dioxacyclohexane, 1,1-diphenylstanna-2,6-dioxacyclohexane, 1,1-dibutylstanna-4,4-dimethyl-2,6-dioxacyclohexane, 1,1-dioctylstanna-4,4-dimethyl-2,6-dioxacyclohexane, 1,1-diphenylstanna-4,4-dimethyl-2,6-dioxacyclohexane, 1,1-dimethylstanna-2,7-dioxacycloheptane, 1,1-dibutylstanna-2,7-dioxacycloheptane, 1,1-dioctylstanna-2,7-dioxacycloheptane, 1,1-diphenylstanna-2,7-dioxacycloheptane, 1,1-dimethylstanna-2,8-dioxaoctane oligomer, 1,1-dibutylstanna-2,8-dioxaoctane oligomer, 1,1-dioctylstanna-2, 8-dioxaoctane oligomer, 1,1-diphenylstanna-2,8-dioxaoctane oligomer, 1,1-dimethylstanna-2,9-dioxanonane oligomer, 1,1-dibutylstanna-2,9-dioxanonane oligomer, 1,1-dioctylstanna-2,9-dioxanonane oligomer, 1,1-diphenylstanna-2,9-dioxanonane oligomer etc.

Among those described above, 1,1-dibutylstanna-2,5-dioxacyclopentane, 1,1-dibutylstanna-2,9-dioxanonane oligomer, 1,1-dioctylstanna-2,5-dioxacyclopentane etc. are preferably used because these tin compounds can be easily obtained.

In the tin compound (2), $R^4$, $R^5$, $R^6$ and $R^7$ independently represent an alkyl group containing 1 to 12 carbon atoms which have a branched chain or a cycloalkyl group containing 5 to 7 carbon atoms, or a phenyl or naphthyl group which may have a substituent group.

$R^4$, $R^5$, $R^6$ and $R^7$ are alkyl groups each containing 1 to 12 carbon atoms which may have a branched chain, and examples are methyl group, ethyl group, n-propyl group, i-propyl group, n-butyl group, t-butyl group, linear or branched pentyl group, hexyl group, heptyl group, octyl group, decyl group etc.; cyclohexyl group; phenyl group; substituted phenyl group such as p-bromophenyl group, p-methoxyphenyl group etc.; and naphthyl group. Among them, $R^4$, $R^5$, $R^6$ and $R^7$ are preferably butyl group and octyl group.

Preferable examples of tin compound (2) include 4,4'-spirobi[1,1-dimethylstanna-2,6-dioxacyclohexane], 4,4'-spirobi[1,1-diethylstanna-2,6-dioxacyclohexane], 4,4'-spirobi[1,1-dibutylstanna-2,6-dioxacylohexane], 4,4'-spirobi[1,1-dioctylstanna-2,6-dioxayclohexane] and 4,4'-spirobi[1,1-didodecylstanna-2,6-dioxacyclohexane].

In the present invention, homopolymerization of β-butyrolactone, or copolymerization of β-butyrolactone with other lactones, is carried out using one or more of the tin compounds (1) and (2) as catalysts. The amount of the tin compounds (1) and/or (2) (or total amount if 2 or more compounds are used in combination) is preferably 1/2000 to 1/40000 mole, preferably 1/4000 to 1/20000 mole, relative to 1 mole of the starting monomer.

In homopolymerization of β-butyrolactone or copolymerization of β-butyrolactone with other lactones, tin compound (1) and/or tin compound (2) is added to the β-butyrolactone subjected previously to acid removal and dehydration treatment as described above, and the ring-opening polymerization may be conducted in the absence or presence of an organic solvent but preferably in the presence of an organic solvent in respect of the control of the polymerization reaction.

The organic solvent may be any solvent used in usual ring-opening polymerization and is not particularly limited, and examples are ethers such as diisopropyl ether, tetrahydrofurane, 1,4-dioxane etc., organic halogenated hydrocarbons such as methylene bromide, dichloroethane, and aromatic hydrocarbons such as toluene, benzene, xylene etc. These solvents may be used singly or in combination thereof.

A purified organic solvent is preferably used. For example, in the case of ethers and aromatic hydrocarbons, it is preferable that they are purified by adding metal sodium and benzophenone and then distilling them in an inert gas atmosphere, and stored in an inert gas until use, and in the case of organic halogenated hydrocarbons, it is preferable that they are purified by adding calcium hydride and then distilling them in an inert gas atmosphere, and stored in an inert atmosphere until use.

Although the amount of the organic solvent used is not particularly limited, the organic solvent is used preferably in an about 1- to 2-fold excess amount relative to the weight of the lactone monomer as the starting material for polymerization. The organic solvent may be added to the reaction system from the start of the polymerization reaction or during the reaction. In particular, a preferable method is as follows: tin compound (1) and/or tin compound (2) is added to the monomer in the absence of the organic solvent, then ring-opening polymerization is conducted for about 2 to 6 hours, and the organic solvent is added thereto so that the reaction is continued until the ring-opening polymerization is completed, whereby the desired high-molecular β-butyrolactone homopolymer or copolymer can be obtained with high yield.

The pressure or temperature for ring-opening polymerization for producing the β-butyrolactone homopolymer or copolymer may be any pressure and temperature at which the desired polymer can be smoothly produced. In general, ring-opening polymerization at atmospheric pressure at a temperature of 40 to 100° C. is advantageous for procedures, facilities, and production costs, and ring-opening polymerization is conducted generally for 1 hour to 7 days under the conditions described above, whereby the desired high-molecular β-butyrolactone homopolymer or copolymer can be obtained smoothly.

Polymerization of β-butyrolactone or copolymerization of β-butyrolactone with other lactones is conducted preferably in an inert gas atmosphere such as argon gas, nitrogen gas or the like.

Both the β-butyrolactone homopolymer and copolymer obtained in the process of the invention described above have a high number average molecular weight of 500,000 or more, and the polymers having an extremely high weight average molecular weight exceeding 1,000,000 can be obtained in some cases.

In particular, the β-butyrolactone homopolymer obtained by the present invention has a weight average molecular weight exceeding 860,000 in almost cases. The β-butyrolactone homopolymer and copolymer having such high molecular weights is not obtained in the prior art described above. The upper limit of the weight average molecular weight is 3,000,000.

The β-butyrolactone homopolymer and copolymer obtained in the present invention have the high molecular weight described above, along with similar thermoplasticity to that of usual lactone-based polyesters, so their heating melt molding, heating melt spinning, heat processing etc. are feasible in an analogous manner to that of general-purpose thermoplastic polyesters, thereby making them effectively usable for production of various molded articles, fibers and other products. The polymers constituting the molded articles, fibers and other products obtained from the β-butyrolactone homopolymer and copolymer of the invention possess high molecular weights, excellent physical characteristics, high melting points and biodegradability, so these products can maintain adequate practicality during use, while being microbially decomposable after use to reduce the problem of environmental pollution.

Further, the homopolymer and copolymer of β-butyrolactone obtained in the present invention are biodegradable, so they can also be used effectively in various medical supplies. Further, the ε-butyrolactone homopolymer and copolymer of the invention can be effectively applied to the same uses as those of general-purpose polyesters. Non-limiting examples to which the ε-butyrolactone homopolymer and copolymer obtained in the present invention are applied includes films and sheets for various uses (e.g. films and sheets for use in packing, agriculture and medicine), fibers and threads (e.g. surgical stitches, fishing lines, surgical gowns etc.), various molded articles (food trays, vessels etc.).

EXAMPLES

Hereinafter, the present invention is described in detail by reference to Examples, which however are not intended to limit the present invention.

Reference Example 1

Synthesis of 1,1-dibutylstanna-2,5-dioxacyclopentane (1) 24.98 g (0.1 mol) of dibutyltin oxide and 6.21 g (0.1 mol) of ethylene glycol were introduced into a 500 ml reaction vessel equipped with a Dean-Stark device, and the atmosphere in the reaction vessel was replaced by argon. 250 ml of benzene was added, and the mixture was dehydrated by azeotropic distillation at 93° C. and stirred for 4 hours during which it became an uniform solution. Then, the solution was filtered while it was hot. The benzene was distilled off under reduced pressure, and the resulting white solids were dried at 60° C. for 3 hours in vaccuo to give 1,1-dibutylstanna-2,5-dioxacyclopentane, 27.6 g (94.2% yield).

(2) The melting point of the 1,1-dibutylstanna-2,5-dioxacyclopentane obtained in item (1) above, as determined in a differential scanning calorimeter (DSC) (apparatus used: "DSC50", Shimadzu Corporation), was 235° C., and measurement of the molecular weight in "M-2000A type apparatus" (Hitachi, Ltd.) by the SIMS method indicated its molecular ion peak at $(M-H)^+=293$.

(3) A nuclear magnetic resonance spectrum (NMR) [apparatus used: "AM-400 type apparatus" (400 MHz), Bruker] of the 1,1-dibutylstanna-2,5-dioxacyclopentane obtained in item (1) above is as follows:

$^1$H-NMR (400 MHz, CDCl$_3$) δppm: 0.92 (6H, t), 1.25–1.5 (8H, m), 1.5–1.8 (4H, m), 3.62 (4H, br)

$^{13}$C-NMR (100 MHz, CDCl$_3$) δppm: 13.6 (CH$_3$), 22.3 (CH$_2$), 27.0 (CH$_2$), 27.5 (CH$_2$), 63.1 (OCH$_2$).

Reference Example 2

Synthesis of 1,1-dibutylstanna-2,9-dioxanonane oligomer (1) 1 g (4.02 mmol) of dibutyltin oxide and 0.4747 g (4.02 mmol) of 1,6-hexanediol were introduced into a 100 ml reaction vessel equipped with a Dean-Stark device, and the atmosphere in the reaction vessel was replaced by argon. 70 ml of toluene was added, and the mixture was dehydrated by azeotropic distillation at 135° C. and stirred for 6.5 hours during which it became an uniform solution. After left overnight at room temperature, the precipitated white solids were filtered. The white solids were dried at 50° C. for 5 hours in vaccuo to give a 1,1-dibutylstanna-2,9-dioxanonane oligomer, 1.22 g (87.0% yield).

(2) The melting point of the 1,1-dibutylstanna-2,9-dioxanonane oligomer obtained in item (1) above, as determined in the same manner as in Reference Example 1, was 40.1° C.

(3) Measurement of the 1,1-dibutylstanna-2,9-dioxanonane oligomer obtained in item (1) above by gel permeation chromatography (GPC) (apparatus used: "D-2520 GPC Integrator", Hitachi, Ltd.: measurement conditions; polystyrene standards), indicated a weight average molecular weight ($M_w$)=1987 to 2017 and a number average molecular weight ($M_n$) 5 to 6.

Reference Example 3

Synthesis of 1,1-dioctylstanna-2,5-dioxacyclopentane (1) 2.0005 g (5.54 mol) of dioctyltin oxide and 0.344 g (5.54 mmol) of ethylene glycol were introduced into a 100 ml reaction vessel equipped with a Dean-Stark device, and the atmosphere in the reaction vessel was replaced by argon. 70 ml of toluene was added, and the mixture was dehydrated by azeotropic distillation at 135° C. and stirred for 25.5 hours during which it became an uniform solution. After left and cooled to 60° C., the toluene was distilled off under reduced pressure. The resulting white solids were dried at 60° C. for 5 hours in vaccuo to give 1,1-dioctylstanna-2,5-dioxacyclopentane, 2.19 g (97.6% yield).

(2) The melting point of the 1,1-dioctylstanna-2,5-dioxacyclopentane obtained in item (1) above, as determined in the same manner as in Reference Example 1, was 148.4° C.

(3) When the molecular weight of the 1,1-dioctylstanna-2,5-dioxacyclopentane obtained in item (1) above was measured in the same manner as in Reference Example 1, its molecular ion peak was detected at $M^+=405$.

(4) A NMR of the 1,1-dioctylstanna-2,5-dioxacyclopentane obtained in item (1) above, as measured in the same manner as in Reference Example 1, is as follows:

$^1$H-NMR (400 MHz, CDCl$_3$) δppm: 0.88 (6H, t), 1.1–1.42 (24H, m), 1.5–1.8 (4H, m), 3.62 (4H, br)

$^{13}$C-NMR (100 MHz, CDCl$_3$) δppm: 14.07 (CH$_3$), 22.51 (CH$_2$), 22.67 (CH$_2$), 25.38 (CH$_2$), 29.24 (CH$_2$), 29.3 (CH$_2$), 31.9 (CH$_2$), 34.16 (CH$_2$), 63.2 (OCH$_2$).

Reference Example 4

Synthesis of [4,4'-spirobi[1,1-dibutylstanno-2,6-dioxacyclohexane (1) 49.78 g (0.2 mol) of dibutyltin oxide and 13.615 g (0.1 mol) of pentaerythritol were introduced into a 1000 ml reaction vessel equipped with a Dean-Stark device, and the atmosphere in the reaction vessel was replaced by argon. 500 ml of toluene was added, and the mixture was dehydrated by azeotropic distillation at 130° C. and stirred for 26.5 hours during which it became an uniform solution. After left and cooled to room temperature, the precipitated white solids were filtered. The white solids were heated and dissolved in 300 ml of toluene, and cooled gradually to room temperature, and the precipitated white solids were filtered. The resulting white solids were dried at 60° C. for 5 hours in vaccuo to give 4,4'-spirobi[1,1-dibutylstanna-2,6-dioxacyclohexane, 52.3 g (87.5% yield).

(2) The melting point of the 4,4'-spirobi[1,1-dibutylstanna-2,6-dioxacyclohexane obtained in item (1) above, as determined in the same manner as in Reference Example 1, was 101° C.

(3) When the molecular weight of the 4,4'-spirobi[1,1-dibutylstanna-2,6-dioxacyclohexane obtained in item (1) above was measured in the same manner as in Reference Example 1, its molecular ion peak was detected at $M^+=598$.

(4) A NMR of the 4,4'-spirobi[1,1-dibutylstanna-2,6-dioxacyclohexane obtained in item (1) above, as measured in the same manner as in Reference Example 1, is as follows:

$^1$H-NMR (400 MHz, CDCl$_3$) δppm: 0.94 (12H, m), 1.2–1.5 (16H, br), 1.5–1.9 (8H, br), 3.5–4.0 (8H, br)

$^{13}$C-NMR (100 MHz, CDCl$_3$) δppm: 13.72 (CH$_3$), 27.0–28.1 (CH$_2$, C), 63.2 (OCH$_2$)

Reference Example 5

Purification (Acid Removal and Dehydration) of (R)-β-butyrolactone (1) To 1,000 g of crude (R)-β-butyrolactone containing 3% by weight of butyric acid was added 80 g of sodium carbonate [8% by weight relative to the (R)-β-butyrolactone], and the mixture was stirred for 24 hours in a water bath at a constant temperature of 25° C. This suspension was filtered and the solids (butyrate etc.) on the filter were washed with 500 ml of diethyl ether whereby the (R)-β-butyrolactone adhering to the solids was recovered, and this wash and the filtrate were combined to give a solution containing crude (R)-β-butyrolactone free of butyric acid.

(2) 10 g of calcium hydride was added in an argon atmosphere to the solution containing crude (R)-β-butyrolactone obtained in item (1) above, and the mixture was stirred at room temperature for 5 hours. Thereafter, the diethyl ether was distilled off in an argon atmosphere at atmospheric pressure and then the product was distilled under reduced pressure (25 Torr) whereby 729 g purified, acid-free, and dehydrated (R)-β-butyrolactone was obtained (73% yield). The boiling point of this purified (R)-β-butyrolactone was 70° C. (25 Torr).

Reference Example 6

Purification (Dehydration Treatment) of (R)-β-butyrolactone 5 g of calcium hydride was added in an argon atmosphere to 100 g of the same crude (R)-β-butyrolactone containing 3% by weight of butyric acid as impurity as in Reference Example 5, and the mixture was stirred at room temperature for 5 hours. Thereafter, the solution was distilled in an argon atmosphere under reduced pressure (25 Torr) whereby 97.8 g of dehydrated (R)-β-butyrolactone was obtained (98% yield). The boiling point of the (R)-β-butyrolactone thus obtained was 70° C. (25 Torr).

Example 1

Production of (R)-β-butyrolactone Homopolymer (1) 34.4 g (0.40 mol) of the purified (R)-β-butyrolactone after acid removal and dehydration treatment, obtained in Reference Example 5, and 19.5 mg (0.0666 mmol) of the 1,1-dibutylstanna-2,5-dioxacyclopentane obtained in Reference Example 1 were introduced into a 250 ml reaction vessel and polymerized under heating at 90° C. for 3 hours with stirring in an argon atmosphere. After addition of 3 ml of dry toluene, the mixture was further polymerized at the same temperature for 1.5 hours. Then, 7 ml of dry toluene was added and the mixture was further polymerized for 2 days. The resultant solid product was separated and recovered from the toluene, dissolved in methylene chloride, and introduced into hexane to be precipitated again, and the precipitates were recovered to give a (R)-β-butyrolactone homopolymer, 32.19 g (93.6% yield).

(2) (i) The weight average molecular weight ($M_w$) and number average molecular weight ($M_n$) of the (R)-β-butyrolactone homopolymer obtained in item (1) above, as determined by GPC in the same manner as in Reference Example 2, are as shown in Table 1 below.

(ii) The melting point and glass transition point of the (R)-β-butyrolactone homopolymer obtained in item (1) above, as determined by DSC in the same manner as in Reference Example 1, are as shown in Table 1 below.

(iii) Further, a specimen was prepared in the following manner from the (R)-β-butyrolactone homopolymer obtained in item (1) above, and measured for tensile strength [apparatus used: "AGF-500B type apparatus", Shimadzu Corporation]. The results are in Table 1 below.

Preparation of a Specimen for Measurement of Tensile Strength

A predetermined amount of the (R)-β-butyrolactone homopolymer obtained in item (1) above was weighed, dissolved in chloroform and formed into a film by casting. This film was formed into pellets and extruded by an injection molder (apparatus used: "MODEL CS-183MMX MINIMAX MOLDER, Custom Scientific Instruments, Inc.) whereby a dumbbell having the shape and dimension shown in FIG. 1 was prepared. This dumbbell was measured for tensile strength in the method described above.

Comparative Example 1

Production of (R)-β-butyrolactone Homopolymer (1) 4.2 g (50 mmol) of the (R)-β-butyrolactone after dehydration treatment, obtained in Reference Example 6, and 1.8 mg (0.00625 mmol) of the 1,1-dibutylstanna-2,5-dioxacyclopentane obtained in Reference Example 1 were introduced into a 100 ml reaction vessel and polymerized under heating at 90° C. for 2.5 hours in an argon atmosphere. After addition of 7 ml of dry toluene, the mixture was further polymerized at the same temperature for 2 days. The resultant solid product was separated and recovered from the toluene, dissolved in methylene chloride, and introduced into hexane to be precipitated again, and the precipitates were recovered to give a (R)-β-butyrolactone homopolymer, 3.61 g (86% yield).

(2) The weight average molecular weight, number average molecular weight, melting point and glass transition point of the (R)-β-butyrolactone homopolymer obtained in item (1) above, as well as the tensile strength of a specimen obtained from said homopolymer were measured in the same manner as in Example 1. The results are shown in Table 1.

Control Example 1

Production of (R)-β-butyrolactone Homopolymer (1) 10.56 g (0.123 mol) of the purified (R)-β-butyrolactone after acid removal and dehydration treatment, obtained in Reference Example 5, and 17.2 mg (0.015 mmol) of 1-ethoxy-3-chlorotetrabutyldistannoxane were introduced into a 150 ml reaction vessel and polymerized under heating at 90° C. for 3 hours with stirring in an argon atmosphere. After addition of 2 ml of dry toluene, the mixture was further polymerized at the same temperature for 18 hours. The resultant solid product was separated and recovered from the toluene, dissolved in methylene chloride, and introduced into hexane to be precipitated again, and the precipitates were recovered to give a (R)-β-butyrolactone homopolymer, 9.82 g (93.0% yield).

(2) The weight average molecular weight, number average molecular weight, melting point and glass transition point of the (R)-β-butyrolactone homopolymer obtained in item (1) above, as well as the tensile strength of a specimen obtained from said homopolymer were measured in the same manner as in Example 1. The results are shown in Table 1 below.

TABLE 1

[Physical properties of (R)-β-butyrolactone homopolymer]

|  | $M_w$ | $M_n$ | Melting point (° C.) | Tg (° C.) | Tensile strength (kgf/cm$^2$) |
| --- | --- | --- | --- | --- | --- |
| Example 1 | 1,050,000 | 567,000 | 158 | 5.1 | 257 |
| Comparative Example 1 | 99,000 | 26,000 | 140 | 4.1 | 82 |
| Control Example 1 | 546,000 | 281,000 | 160 | 3 | 258 |

The (R)-β-butyrolactone homopolymer in Example 1, which was obtained by ring-opening polymerization of the purified (R)-β-butyrolactone subjected to both acid removal and dehydration treatment in the presence of the tin compound (1), has an extremely high molecular weight ($M_w$) exceeding 1,000,000, has a high melting point, and has high tensile strength and is thus excellent in physical characteristics, as can be seen from the results in Table 1.

On the other hand, the (R)-β-butyrolactone homopolymer in Comparative Example 1, which was obtained by ring-opening polymerization of the (R)-β-butyrolactone subjected to dehydration treatment but not to acid removal in the presence of the tin compound (1), has a weight average molecular weight ($M_w$) of 99,000, and this homopolymer is significantly low in molecular weight, is low in melting point, and is also inferior in tensile strength as compared with the homopolymer obtained in Example 1.

Further, the (R)-β-butyrolactone homopolymer in Control Example 1, obtained by ring-opening polymerization of the purified (R)-β-butyrolactone subjected to both acid removal and dehydration treatment but in the presence of a different tin compound from the tin compounds (1) and (2), has a weight average molecular weight ($M_w$) of 546,000 which is significantly higher than in Comparative Example 1, but is lower than in Example 1.

Example 2

Production of (R)-β-butyrolactone/ε-caprolactone Copolymer (1) 31.0 g (0.36 mol) of the purified (R)-β-butyrolactone subjected to acid removal and dehydration treatment, obtained in Reference Example 5, 4.57 g (0.04 mol) of ε-caprolactone, and 19.5 mg (0.0666 mmol) of the 1,1-dibutylstanna-2,5-dioxacyclopentane obtained in Reference Example 1 were introduced into a 250 ml reaction vessel and polymerized under heating at 90° C. for 3 hours with stirring in an argon atmosphere. After addition of 3 ml of dry toluene, the mixture was further polymerized at the same temperature for 1.5 hours. Then, 7 ml of dry toluene was added and the mixture was further polymerized for 2 days. The resultant solid product was separated and recovered from the toluene, dissolved in methylene chloride, and introduced into hexane to be precipitated again whereby a (R)-β-butyrolactone/fÄ-caprolactone copolymer, 33.93 g (95.4% yield), was obtained.

(2) The weight average molecular weight, number average molecular weight, melting point and glass transition point of the (R)-β-butyrolactone/ε-caprolactone copolymer obtained in item (1) above, as well as the tensile strength of a specimen obtained from said copolymer, were measured in the same manner as in Example 1. The results are shown in Table 2 below.

The ratio (molar ratio) of the structural units derived from (R)-β-butyrolactone and the structural unit derived from ε-caprolactone in the (R)-β-butyrolactone/ε-caprolactone copolymer obtained in item (1) above was examined by nuclear magnetic resonance (NMR) [apparatus used; "AM-400 type apparatus" (400 MHz), Bruker]. The result is shown in Table 2 below.

Example 3

Production of (R)-β-butyrolactone/ε-caprolactone Copolymer (1) 31.0 g (0.36 mol) of the purified (R)-β-butyrolactone subjected to acid removal and dehydration treatment, obtained in Reference Example 5, 4.57 g (0.04 mol) of ε-caprolactone, and 17.5 mg (0.05 mmol) of the 1,1-dibutylstanna-2,9-dioxacyclononane obtained in Reference Example 2 were introduced into a 250 ml reaction vessel and polymerized by heating at 90° C. for 3 hours with stirring in an argon atmosphere. After addition of 5 ml of dry toluene, the mixture was further polymerized at the same temperature for 2 hours. Then, 5 ml of dry toluene was added and the mixture was further polymerized at the same temperature for 3 days. The resultant solid product was separated and recovered from the toluene, dissolved in methylene chloride, and introduced into hexane to be precipitated again whereby a (R)-β-butyrolactone/ε-caprolactone copolymer, 33.06 g (93.0% yield), was obtained.

(2) The weight average molecular weight, number average molecular weight, melting point and glass transition point of the (R)-β-butyrolactone/ε-caprolactone copolymer obtained in item (1) above, and the molar ratio of the structural units derived from the respective monomers therein, as well as the tensile strength of a specimen obtained from said copolymer were measured in the same manner as in Example 1. The results are shown in Table 2 below.

Example 4

Production of (R)-β-butyrolactone/ε-caprolactone Copolymer (1) 31.0 g (0.36 mol) of the purified (R)-β-butyrolactone subjected to acid removal and dehydration treatment, obtained in Reference Example 5, 4.57 g (0.04 mol) of ε-caprolactone, and 20.3 mg (0.05 mmol) of the 1,1-dioctylstanna-2,5-dioxacyclopentane obtained in Reference Example 3 were introduced into a 250 ml reaction vessel and polymerized under heating at 90° C. for 5 hours with stirring in an argon atmosphere. After addition of 2 ml of dry toluene, the mixture was further polymerized at the same temperature for 3 hours. Then, 5 ml of dry toluene was added and the mixture was further polymerized at the same temperature for 3 days. The resultant solid product was separated and recovered from the toluene, dissolved in methylene chloride, and introduced into hexane to be precipitated again whereby a (R)-β-butyrolactone/ε-caprolactone copolymer, 2.61 g (91.7% yield), was obtained.

(2) The weight average molecular weight, number average molecular weight, melting point and glass transition point of the (R)-β-butyrolactone/ε-caprolactone copolymer obtained in item (1) above, and the molar ratio of the structural units derived from the respective monomers therein, as well as the tensile strength of a specimen obtained from said copolymer were measured in the same manner as in Example 1. The results are shown in Table 2 below.

Example 5

Production of (R)-β-butyrolactone and ε-caprolactone Copolymer (1) 31.0 g (0.36 mol) of the purified (R)-β-butyrolactone subjected to acid removal and dehydration treatment, obtained in Reference Example 5, 4.57 g (0.04 mol) of ε-caprolactone, and 14.9 mg (0.025 mmol) of the 4,4'-spirobi[1,1-dibutylstanna-2,6-dioxacyclohexane] obtained in Reference Example 4 were introduced into a 250 ml reaction vessel and polymerized under heating at 90° C. for 2.5 hours with stirring in an argon atmosphere. After addition of 10 ml of dry toluene, the mixture was further polymerized at the same temperature for 4 hours. Then, 10 ml of dry toluene was added and the mixture was further polymerized at the same temperature for 2 hours, and then 10 ml of dry toluene was added and the mixture was further polymerized at the same temperature for 4 days. The resultant solid product was separated and recovered from the toluene, dissolved in methylene chloride, and introduced into hexane to be precipitated again whereby a (R)-β-butyrolactone/ε-caprolactone copolymer, 29.65 g (83.4% yield), was obtained.

(2) The weight average molecular weight, number average molecular weight, melting point and glass transition point of the (R)-β-butyrolactone/ε-caprolactone copolymer obtained in item (1) above, and the molar ratio of the structural units derived from the respective monomers therein, as well as the tensile strength of a specimen obtained from said copolymer were measured in the same manner as in Example 1. The results are shown in Table 2 below.

Comparative Example 2

Production of (R)-β-butyrolactone/ε-caprolactone Copolymer (1) 31.0 g (0.36 mol) of the purified (R)-β-butyrolactone subjected to only dehydration treatment, obtained in Reference Example 6, 4.57 g (0.04 mol) of ε-caprolactone, and 7.3 mg (0.025 mmol) of the 1,1-dibutylstanna-2,5-dioxacyclopentane obtained in Reference Example 1 were introduced into a 250 ml reaction vessel and polymerized under heating at 90° C. for 2.5 hours with stirring in an argon atmosphere. After addition of 10 ml of dry toluene, the mixture was further polymerized at the same temperature for 4 hours. Then, 10 ml of dry toluene was added and the mixture was further polymerized at the same temperature for 2 hours, and 10 ml of dry toluene was added and the mixture was further polymerized at the same temperature for 4 days. The resultant solid product was separated and recovered from the toluene, dissolved in methylene chloride, and introduced into hexane to be precipitated again whereby a (R)-β-butyrolactone/ε-caprolactone copolymer, 30.29 g (85.2% yield), was obtained.

(2) The weight average molecular weight, number average molecular weight, melting point and glass transition point of the (R)-β-butyrolactone/ε-caprolactone copolymer obtained in item (1) above, and the molar ratio of the structural units derived from the respective monomers therein, as well as the tensile strength of a specimen obtained from said copolymer were measured in the same manner as in Example 1. The results are shown in Table 2 below.

Control Example 2

Production of (R)-β-butyrolactone/ε-caprolactone Copolymer (1) 15.50 g (0.18 mol) of the purified (R)-β-butyrolactone subjected to acid removal and dehydration treatment, obtained in Reference Example 5, 2.28 g (0.02 mol) of ε-caprolactone, and 28.1 mg (0.025 mmol) of 1-ethoxy-3-chlorotetrabutyldistannoxane were introduced into a 250 ml reaction vessel and polymerized under heating at 90° C. for 2 hours with stirring in an argon atmosphere. After addition of 3 ml of dry toluene, the mixture was further polymerized at the same temperature for 3 hours. Then, 10 ml of dry toluene was added and the mixture was further polymerized at the same temperature for 24 hours. The resultant solid product was separated and recovered from the toluene, dissolved in methylene chloride, and introduced into hexane to be precipitated again whereby a (R)-β-butyrolactone/ε-caprolactone copolymer, 15.78 g (88.8% yield), was obtained.

(2) The weight average molecular weight, number average molecular weight, melting point and glass transition point of the (R)-β-butyrolactone/ε-caprolactone copolymer obtained in item (1) above, and the molar ratio of the structural units derived from the respective monomers therein, as well as the tensile strength of a specimen obtained from said copolymer were measured in the same manner as in Example 1. The results are shown in Table 2 below.

TABLE 2

| | Example 2 | Example 3 | Example 4 | Example 5 | Comparative Example 2 | Control Example 2 |
|---|---|---|---|---|---|---|
| □üStarting material Monomer ratio[1] (β-BL/ε-CP) | 90/10 | 90/10 | 90/10 | 90/10 | 90/10 | 90/10 |
| □üPhysical properties of copolymer Structural unit ratio[2] (β-BL/ε-CP) | 89.9/10.1 | 90.6/9.4 | 89.8/10.2 | 87.8/10.2 | 88.5/10.5 | 88.5/10.5 |
| Weight average molecular weight | 1,077,000 | 505,000 | 654,000 | 1,150,000 | 55,000 | 285,000 |
| Number average molecular weight | 502,000 | 248,000 | 332,000 | 527,000 | 42,000 | 187,111 |
| Melting point (° C.) | 124 (1st) 128 (2nd) | 130 | 132 | 124 (1st) 128 (2nd) | 99.5 | 134 |
| Tg (° C.) | −9.1 | −12.9 | −10.0 | −11.8 | −10.0 | −3.0 |
| Tensile strength[3] | 196 | 186 | 188 | 203 | 76 | 156 |

[1] Molar ratio of (R)-β-butyrolactone and ε-caprolactone used in production of the copolymer
[2] Molar ratio of the structural unit derived from (R)-β-butyrolactone and the structural unit derived from ε-caprolactone in the formed copolymer
[3] Unit: kgf/cm$^2$ The (R)-β-butyrolactone/ε-caprolactone copolymers in Examples 2 to 5, which were obtained by ring-opening polymerization, with another lactone (ε-caprolactone), of the purified (R)-β-butyrolactone subjected to both acid removal and dehydration treatment in the presence of the tin compound (1) or the tin compound (2), have a high weight average molecular weight ($M_w$) exceeding 500,000, have a high melting point, and have high tensile strength and are thus excellent in physical characteristics, as can be seen from the results in Table 2.

On the other hand, the (R)-β-butyrolactone/ε-caprolactone copolymer in Comparative Example 2, which was obtained by ring-opening polymerization, with ε-caprolactone, of the (R)-β-butyrolactone subjected to dehydration treatment but not to acid removal, in the presence of the tin compound (1), has a weight average molecular weight ($M_w$) of 55,000, and this copolymer is significantly low in molecular weight, is low in melting point, and is also inferior in tensile strength as compared with the β-butyrolactone/ε-caprolactone copolymers obtained in Examples 2 to 5.

Further, the (R)-β-butyrolactone/ε-caprolactone copolymer in Control Example 2, obtained by ring-opening polymerization, with ε-caprolactone, of the purified (R)-β-butyrolactone subjected to both acid removal and dehydration treatment, but in the presence of a different tin compound from the tin compounds (1) and (2), has a weight average molecular weight ($M_w$) of 285,000 which is significantly higher than in Comparative Example 2, but is lower than in Examples 2 to 5.

According to the process of the invention, a high-molecular β-butyrolactone homopolymer and copolymer having a high number average molecular weight ($M_w$) of 500,000 or more can be produced with high yield and good productivity by chemical synthesis, and the β-butyrolactone homopolymer and copolymer having an extremely high weight average molecular weight exceeding 1,000,000 can also be obtained in some cases. In particular, the β-butyrolactone homopolymer with a weight average molecular weight exceeding 860,000 can be obtained easily in almost cases.

The β-butyrolactone homopolymer and copolymer obtained in the present invention have not only thermoplasticity but also the high molecular weights described above, so their heating melt molding, heating melt spinning, heat processing etc. are feasible in an analogous manner to that of general-purpose thermoplastic polyesters, thereby making them effectively usable for production of various molded articles, fibers and other products with practically high physical characteristics.

Further, the β-butyrolactone homopolymer and copolymer obtained in the present invention are biodegradable, so these products can maintain adequate practicality during use, while being microbially decomposable after use to reduce the problem of environmental pollution.

The ε-butyrolactone homopolymer and copolymer obtained in the present invention are biocompatible and thus can be used effectively for a wide variety of medical supplies.

What is claimed is:

1. A β-butyrolactone homopolymer with a weight average molecular weight exceeding 860,000, which β-butyrolactone homopolymer is formed by a process which comprises ring-opening polymerization of β-butyrolactone alone, in which the ring-opening polymerization is conducted using β-butyrolactone subjected previously to acid removal and dehydration treatment.

2. The β-butyrolactone homopolymer of claim 1 formed by a process for producing a β-butyrolactone homopolymer which comprises ring-opening polymerization of β-butyrolactone alone, in which the ring-opening polymerization is conducted using β-butyrolactone subjected previously to acid removal and dehydration treatment and in the presence of one or more compounds selected from the group consisting of tin compounds represented by the general formula (1):

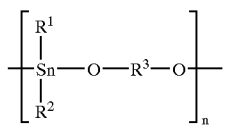

(1)

wherein $R^1$ and $R^2$ independently represent an alkyl group containing 1 to 12 carbon atoms which may have a branched chain, or a cycloalkyl group containing 5 to 7 carbon atoms, or a phenyl or naphthyl group which may have a substituent group, $R^3$ represents an alkylene group containing 2 to 12 carbon atoms which may have a substituent group, a cyclopentane-1,2-ylene group or a cyclohexane-1,2-ylene group, and n is an integer of 1 to 10, and tin compounds represented by the general formula (2):

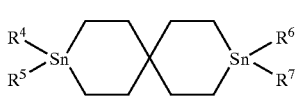

(2)

wherein $R^4$ to $R^7$ independently represent an alkyl group containing 1 to 12 carbon atoms which may have a branched chain, or a cycloalkyl group containing 5 to 7 carbon atoms, or a phenyl or naphthyl group which may have a substituent group.

3. The β-butyrolactone homopolymer of claim 1 having a molecular weight of 1,000,000 or more.

4. A β-butyrolactone copolymer with a weight average molecular weight of 500,000 or more which is formed by ring opening polymerization conducted using β-butyrolactone subjected previously to acid removal and dehydration treatment, wherein said copolymer is a copolymer of β-butyrolactone and one or more lactones different from β-butyrolactone and having a 4-, 5-, 6-, 7-, 12-, 16- or 17-membered ring.

5. The copolymer of claim 4, wherein the molar ratio of β-butyrolactone: the one or more lactones different from β-butyrolactone is 99:1 to 1:99.

6. The copolymer of claim 5, wherein the molar ratio is 99:1 to 50:50.

7. The copolymer of claim 6, wherein the weight average molecular weight is 1,000,000 or more.

8. The β-butyrolactone homopolymer of claim 2, where the acid removal is first conducted whereafter the dehydration treatment is conducted.

9. The β-butyrolactone homopolymer of claim 8, wherein the acid removal is conducted by adding one or more inorganic alkaline compounds to the β-butyrolactone.

10. The β-butyrolactone homopolymer of claim 9, wherein the dehydration treatment is conducted by adding one or more drying agents to the β-butyrolactone.

11. The β-butyrolactone homopolymer of claim 10, wherein the one or more inorganic alkaline compounds are selected from the group consisting of sodium carbonate, potassium carbonate, calcium carbonate, magnesium carbonate, barium carbonate, sodium hydrogen carbonate, potassium hydrogen carbonate, calcium oxide, magnesium oxide and barium oxide, and the one or more drying agents are selected from the group consisting of calcium hydride, magnesium oxide and barium oxide.

12. The β-butyrolactone homopolymer of claim 11, wherein the one or more inorganic alkaline compounds are added in an amount of about 1- to 2-fold excess moles relative to acids contained in the β-butyrolactone and the dehydration treatment is conducted under an inert gas and wherein after the dehydration treatment, the β-butyrolactone is in solution form and is distilled to yield the β-butyrolactone used in the ring opening polymerization.

13. The β-butyrolactone homopolymer of claim 12, wherein the acid removal is conducted using sodium carbonate, the dehydration treatment is conducted using calcium hydride, and the tin compound used is 1,1-dibutylstanna-2,5-dioxacyclopentane.

14. The β-butyrolactone homopolymer of claim 13, where the homopolymer is (R)-β-butyrolactone homopolymer.

15. The β-butyrolactone copolymer of claim 12, where the acid removal is first conducted whereafter the dehydration treatment is conducted.

16. The β-butyrolactone copolymer of claim 15, wherein the acid removal is conducted by adding one or more inorganic alkaline compounds to the β-butyrolactone.

17. The β-butyrolactone copolymer of claim 16, wherein the dehydration treatment is conducted by adding one or more drying agents to the β-butyrolactone.

18. The β-butyrolactone copolymer of claim 17, wherein the one or more inorganic alkaline compounds are selected from the group consisting of sodium carbonate, potassium carbonate, calcium carbonate, magnesium carbonate, barium carbonate, sodium hydrogen carbonate, potassium hydrogen carbonate, calcium oxide, magnesium oxide and barium oxide, and the one or more drying agents are selected from the group consisting of calcium hydride, magnesium oxide and barium oxide.

19. The β-butyrolactone copolymer of claim 18, wherein the one or more inorganic alkaline compounds are added in an amount of about 1- to 2-fold excess moles relative to acids contained in the β-butyrolactone and the dehydration treatment is conducted under an inert gas and wherein after the dehydration treatment, the β-butyrolactone is in solution form and is distilled to yield the β-butyrolactone used in the ring opening polymerization.

20. The β-butyrolactone copolymer of claim 19, wherein the acid removal is conducted using sodium carbonate, the dehydration treatment is conducted using calcium hydride, and the tin compound used is 1,1-dibutylstanna-2,5-dioxacyclopentane.

21. The β-butyrolactone copolymer of claim 19, where the copolymer is (R)-β-butyrolactone/ε-caprolactone copolymer).

22. A β-butyrolactone copolymer with a weight average molecular weight of 500,000 or more, which β-butyrolactone copolymer is formed by a process which comprises ring opening polymerization conducted using β-butyrolactone subjected previously to acid removal and dehydration treatment, wherein said copolymer is a copolymer of β-butyrolactone and one or more lactones different from β-butyrolactone.

23. The β-butyrolactone copolymer of claim 22 which is formed by ring-opening polymerization in the presence of one or more compound selected from the group consisting of tin compounds represented by the general formula (1):

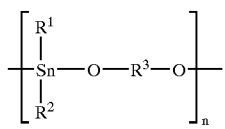

(1)

wherein $R^1$ and $R^2$ independently represent an alkyl group containing 1 to 12 carbon atoms which may have a branched chain, or a cycloalkyl group containing 5 to 7 carbon atoms, or a phenyl or naphthyl group which may a substituent group, $R^3$ represents an alkylene group containing 2 to 12 carbon atoms which may have a substituent group, a cyclopentane-1,2-ylene group or a cyclohexane-1,2-ylene group, and n is an integer of 1 to 10, and tin compounds represented by the general formula (2):

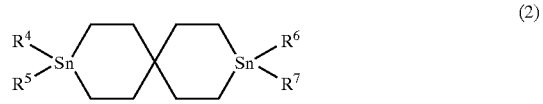

(2)

wherein $R^4$ to $R^7$ independently represent an alkyl group containing 1 to 12 carbon atoms which may have a branched chain, or a cycloalkyl group containing 5 to 7 carbon atoms, or a phenyl or naphthyl group which may have a substituent group.

* * * * *